(12) United States Patent
Bigelow et al.

(10) Patent No.: US 9,050,671 B2
(45) Date of Patent: Jun. 9, 2015

(54) ELECTRODE HOLDER FOR EDM COUPLED TO A MILLING MACHINE

(75) Inventors: Louis Christian Bigelow, Whittier, CA (US); Sami R. Hermes, Laguna Beach, CA (US)

(73) Assignee: Turbine Engine Components Technologies Corporation, Thomasville, GA (US)

(*) Notice: Subject to any disclaimer, the term of this patent is extended or adjusted under 35 U.S.C. 154(b) by 813 days.

(21) Appl. No.: 13/247,200

(22) Filed: Sep. 28, 2011

(65) Prior Publication Data

US 2013/0075370 A1    Mar. 28, 2013

(51) Int. Cl.
| B23H 1/00 | (2006.01) |
| B23H 11/00 | (2006.01) |
| B23H 7/26 | (2006.01) |

(52) U.S. Cl.
CPC .. B23H 1/00 (2013.01); B23H 7/26 (2013.01); B23H 11/00 (2013.01)

(58) Field of Classification Search
CPC .. B23Q 3/15506; B23Q 3/15513; B23H 1/00; B23H 7/26; B23H 11/00
USPC ...................................................... 219/69.15
See application file for complete search history.

(56) References Cited

U.S. PATENT DOCUMENTS

| 3,601,572 | A |  | 8/1971 | Check et al. |
| 4,191,878 | A |  | 3/1980 | Check et al. |
| 4,316,071 | A | * | 2/1982 | Bonga ......................... 219/69.11 |
| 4,409,464 | A | * | 10/1983 | Favareto et al. ............... 219/136 |
| 4,510,364 | A |  | 4/1985 | Ito |
| 4,563,800 | A | * | 1/1986 | Bonga .............................. 483/16 |
| 4,596,066 | A | * | 6/1986 | Inoue ......................... 219/69.15 |
| 4,754,115 | A |  | 6/1988 | Rhoades |
| 5,038,012 | A | * | 8/1991 | Walter ....................... 219/69.15 |
| 5,187,899 | A |  | 2/1993 | Rhoades |
| 5,444,332 | A |  | 8/1995 | Chang et al. |
| 5,906,378 | A | * | 5/1999 | Nordquist .................. 219/69.15 |
| 5,909,882 | A | * | 6/1999 | Schill ......................... 219/69.15 |
| 6,225,589 | B1 |  | 5/2001 | Bartok |
| 6,448,528 | B1 | * | 9/2002 | Yoshida ..................... 219/69.15 |
| 7,030,332 | B2 |  | 4/2006 | Hastilow et al. |
| 7,329,825 | B2 | * | 2/2008 | Awakura .................... 219/69.15 |
| 8,274,008 | B2 | * | 9/2012 | Keihl et al. ................. 219/69.15 |
| 2002/0079293 | A1 |  | 6/2002 | Tobler et al. |
| 2007/0084833 | A1 |  | 4/2007 | Xidacis |

* cited by examiner

*Primary Examiner* — Geoffrey S Evans
(74) *Attorney, Agent, or Firm* — Jones Day

(57) ABSTRACT

An apparatus is configured for use with an electrode and a CNC machine tool. The apparatus includes a holder configured to hold the electrode in a position projecting outward from the holder, and a pull stud configured to mount the holder on the CNC machine tool. The apparatus further includes a driving mechanism that is operative to provide a motive force, and a coupling configured to couple the holder with the driving mechanism when the holder is not mounted on the CNC machine tool. The holder is configured to transmit the motive force from the coupling to the electrode in the holder to move the electrode outward of the holder.

15 Claims, 7 Drawing Sheets

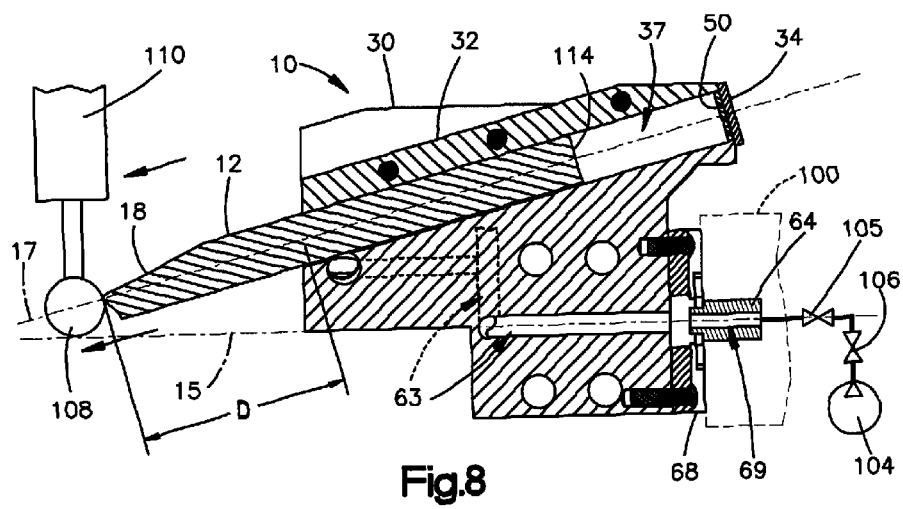
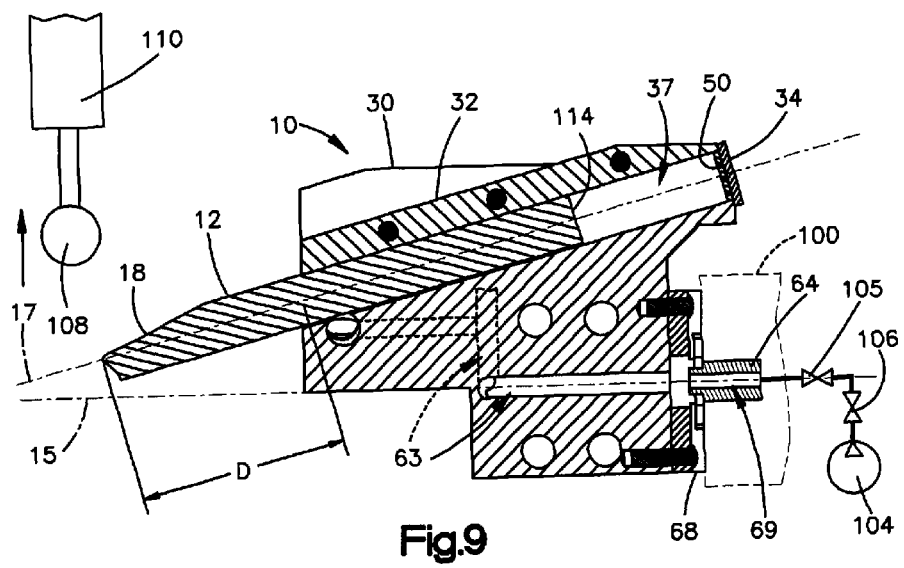

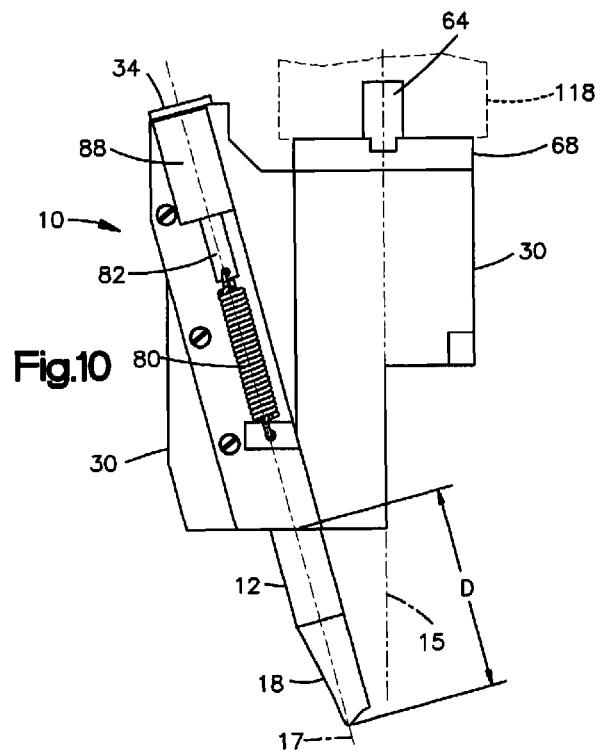
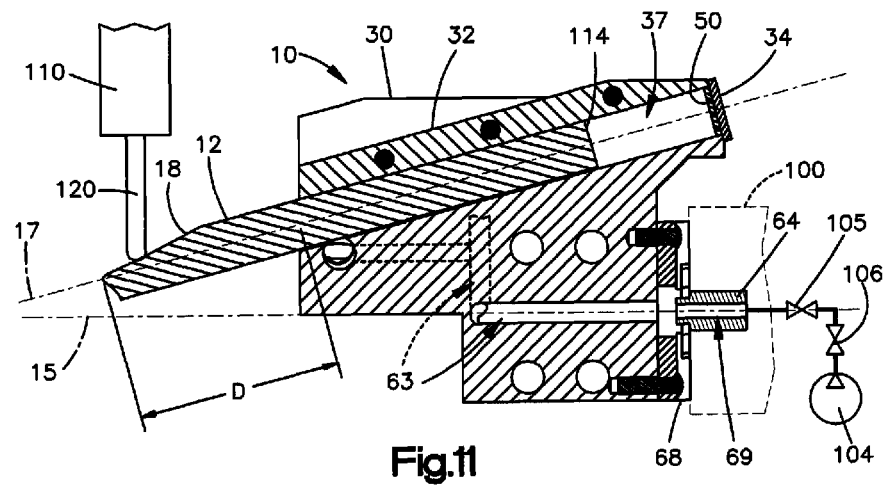

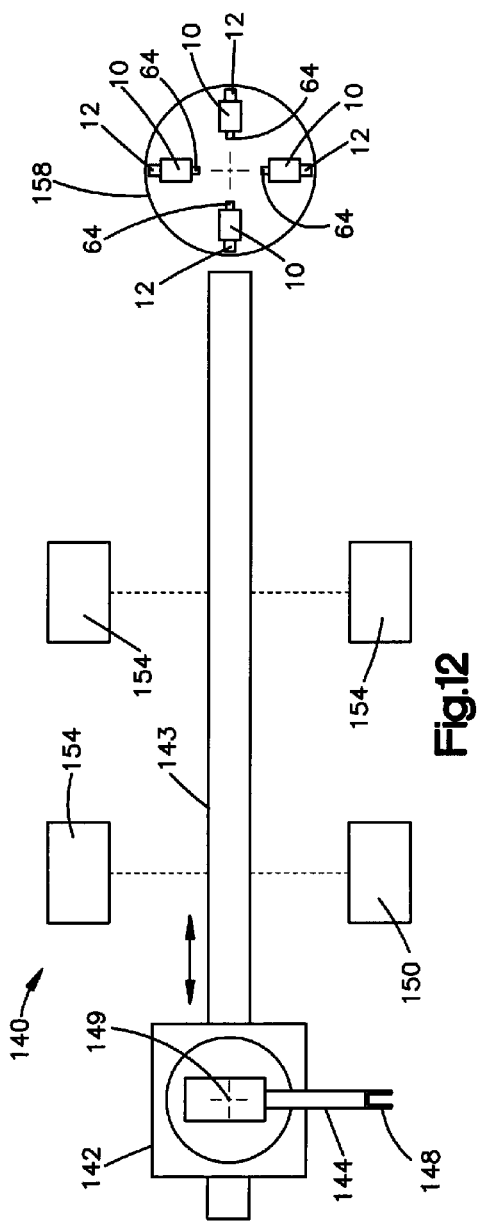
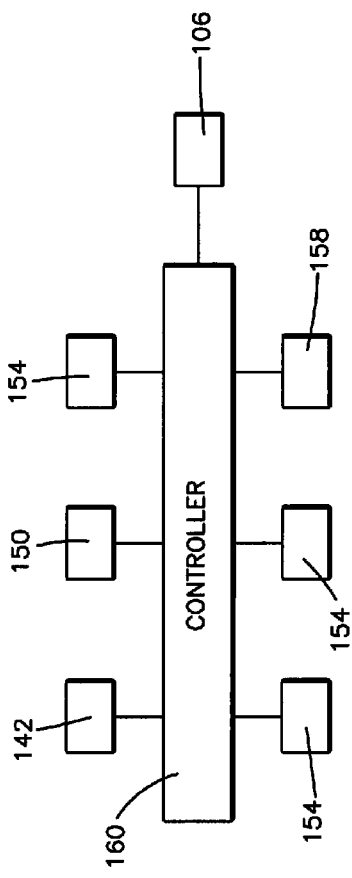
Fig.12
Fig.13

ELECTRODE HOLDER FOR EDM COUPLED TO A MILLING MACHINE

TECHNICAL FIELD

This technology includes methods, systems, and devices for using an electrode on a computer numerical control (CNC) machine tool.

BACKGROUND

Electrical discharge machining (EDM) is a particular type of CNC machine tool process. An EDM process shapes a workpiece by striking the workpiece with sparks emitted from an EDM electrode. The manner in which the sparks act upon the workpiece is determined by factors including the shape and position of the electrode. A complex workpiece feature, such as a turbine airfoil, may require a correspondingly complex shape for the electrode. If the electrode becomes worn through multiple EDM cycles, it can be restored to its original shape in a process known as redressing.

SUMMARY

An apparatus is configured for use with an electrode and a CNC machine tool. The apparatus includes a holder configured to hold the electrode in a position projecting outward from the holder, and a pull stud configured to mount the holder on the CNC machine tool. The apparatus further includes a driving mechanism that is operative to provide a motive force, and a coupling configured to couple the holder with the driving mechanism when the holder is not mounted on the CNC machine tool. The holder is configured to transmit the motive force from the coupling to the electrode in the holder to move the electrode outward of the holder.

A method includes the steps of placing an electrode holder in a position defining a path of movement for an electrode to be moved outward of the holder, and moving an electrode outward of the holder along the path of movement. The electrode is preferably moved outward of the holder under a force applied automatically, such a pneumatic pressure force, without a manually applied force. Outward movement of the electrode is stopped by a structure that is spaced a predetermined distance from the holder. This places the electrode in an extended position projecting the predetermined distance outward from the holder.

In a preferred implementation, the electrode holder is mounted on a milling machine in a position defining a path of movement for an electrode to be moved outward of the holder. The electrode is moved outward of the holder along the path of movement while the holder remains on the milling machine. Outward movement of the electrode is stopped by a structure that is located in the path of movement at a position spaced a predetermined distance from the holder. This places the electrode in an extended position projecting the predetermined distance outward from the holder on the milling machine. The method further includes the step of redressing the electrode while the electrode remains in the extended position projecting the predetermined distance outward from the holder on the milling machine.

A more extensive method includes the steps of (a) moving the electrode in the holder to a position projecting a predetermined distance outward from the holder, and (b) mounting the holder on a CNC machine tool with the electrode in the position projecting the predetermined distance outward from the holder. Further steps include (c) performing multiple machining jobs with the electrode while the holder remains mounted on the CNC machine tool with the electrode in the holder, and (d) while maintaining the electrode in the holder, removing the holder from the CNC machine tool at the conclusion of the multiple machining jobs, redressing the electrode, and repeating steps (b) and (c) with the redressed electrode. Step (d) is preferably repeated without removing the electrode from the holder.

BRIEF DESCRIPTION OF THE DRAWINGS

FIGS. 6-9 are views similar to FIG. 4, showing different steps taken in a method of using the electrode holder.

FIG. 10 is a view of the electrode holder in position on a CNC machine tool.

FIG. 11 also is a view similar to FIG. 4, and shows another step taken in the method of using the electrode holder.

FIG. 12 is a schematic view of a system for using the electrode holder.

FIG. 13 is a schematic view of parts of the system of FIG. 12.

DETAILED DESCRIPTION

Figure 1:
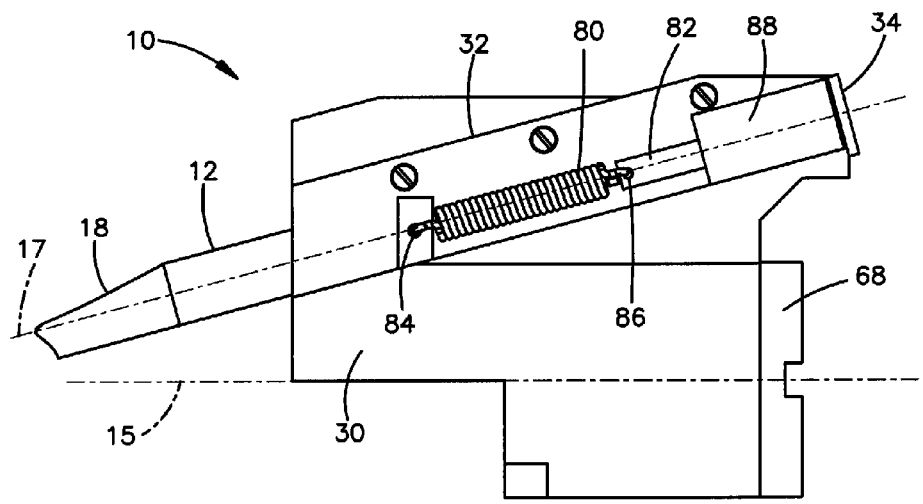
FIG. 1 is a side view of an electrode holder with an electrode projecting outward from the holder.

The apparatus shown in the drawings has parts that are examples of the elements recited in the apparatus claims, and can be operated in steps that are examples of the elements recited in the method claims. The following description thus includes examples of how a person of ordinary skill in the art can make and use the claimed invention. It is intended to meet the requirements of enablement and best mode without imposing limitations that are not recited in the claims.

A holder 10 for an electrode 12 is shown in FIG. 1. The holder 10 is configured for mounting on a CNC machine tool. In this particular embodiment, the electrode 12 is an EDM electrode, and the holder 10 is configured for mounting on an EDM machine for movement along and about a first axis 15. The electrode 12 is an elongated part that projects longitudinally outward from the holder 10 along a second axis 17 at an acute angle to the first axis 15. An outer end portion 18 of the electrode 12 is thus arranged for engagement with a workpiece in an EDM process for shaping the workpiece.

The configuration of the outer end portion 18 of the electrode 12, as well as the location and orientation of the electrode 12 relative to the axes 15 and 17, is predetermined with reference to the size and shape specified for the structural feature of the workpiece to be formed in the EDM process. In this particular embodiment, the structural feature to be formed by the electrode 12 is a turbine airfoil. As multiple features are formed by repeated engagement of the electrode 12 with the workpiece, the resulting wear causes the shape of the outer end portion 18 to change. Wear at the outer end portion 18 also reduces the length of the electrode 12. It is therefore necessary to redress the outer end portion 18 of the electrode 12, and also to reposition the electrode 12 axially, after multiple cycles of use.

Figure 2:
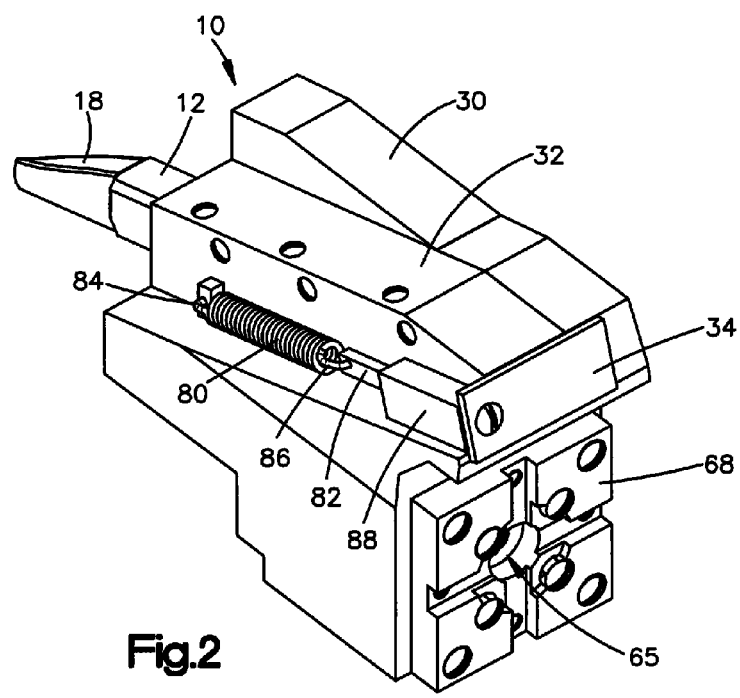
FIG. 2 is a rear perspective view of the parts shown in FIG. 1.
Figure 3:
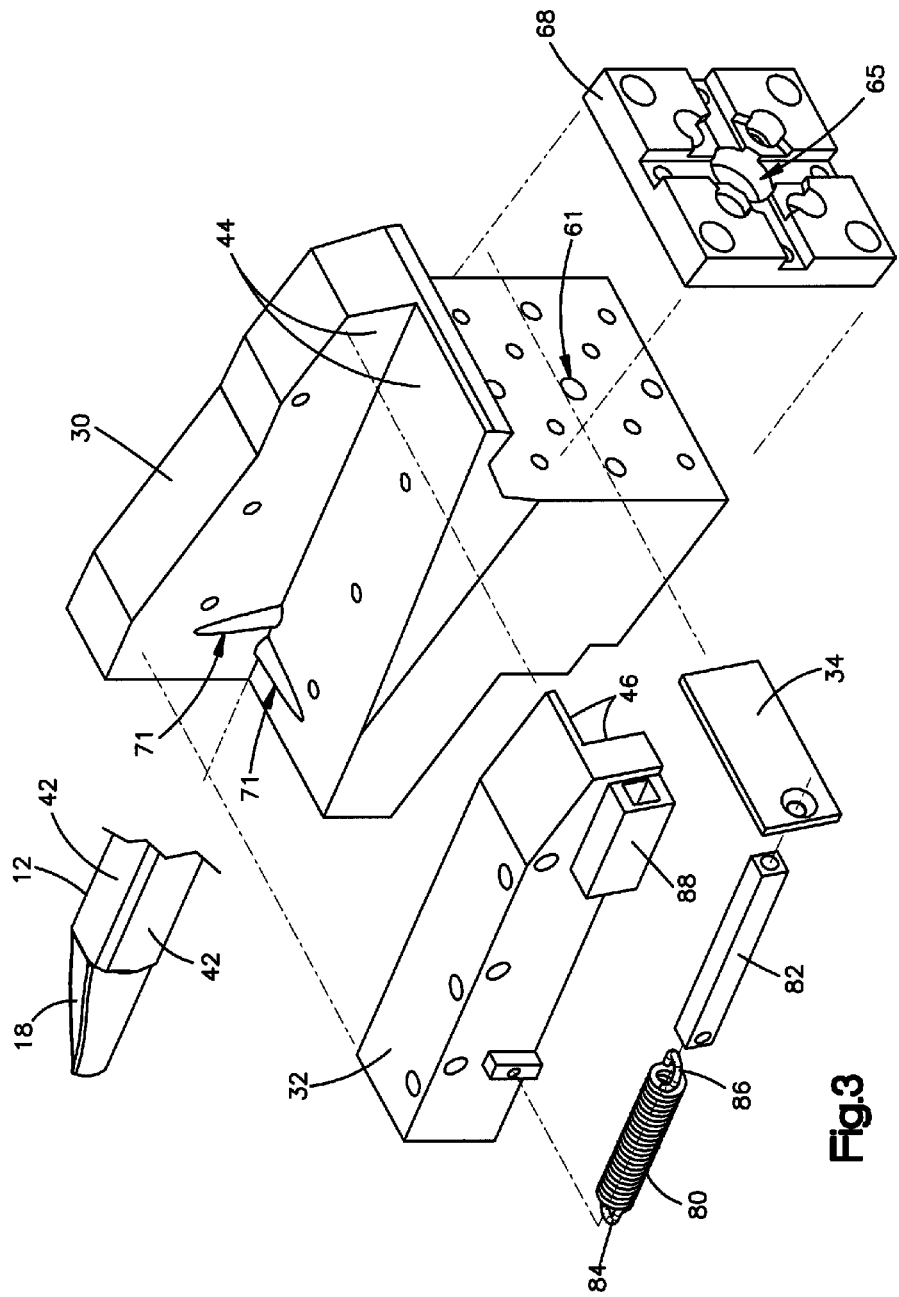
FIG. 3 is an exploded rear perspective view of the electrode holder, with fasteners omitted for clarity of illustration.
Figure 4:
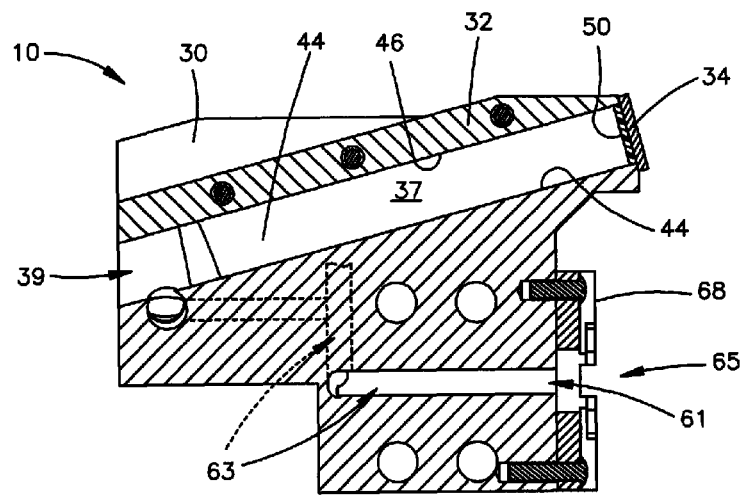
FIG. 4 is a side sectional view of the electrode holder.
Figures 5, 5A:
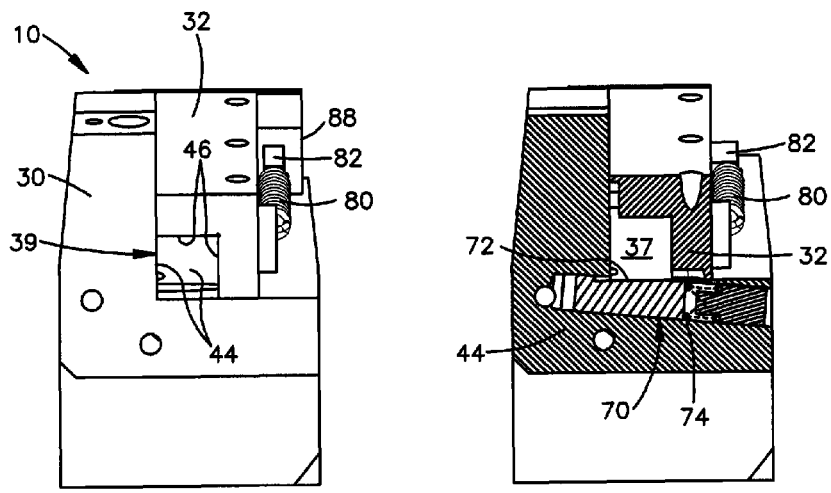
FIG. 5 is a front view of the electrode holder.
FIG. 5A is a partially sectional view of the holder as shown in FIG. 5.

The parts of the holder 10 shown in FIGS. 1-3 include a main body 30, a cover 32, and a back plate 34. As best shown in FIGS. 4 and 5, these parts of the holder 10 together define an elongated chamber 37 with an open front end 39 for receiving the electrode 12. Specifically, a major length portion of the electrode 12 has planar side surfaces 42 (FIG. 3) that provide a rectangular cross sectional shape. The main body 30 and the cover 32 have corresponding planar surfaces 44 and 46. Those surfaces 44 and 46 provide the chamber 37 with a rectangular cross sectional shape that is sized for the major length portion of the electrode 12 to fit closely within the chamber 37. The back plate 34 defines the rear end of the chamber 37, and has an elastomeric pad 50 on its inner side.

Figure 6:
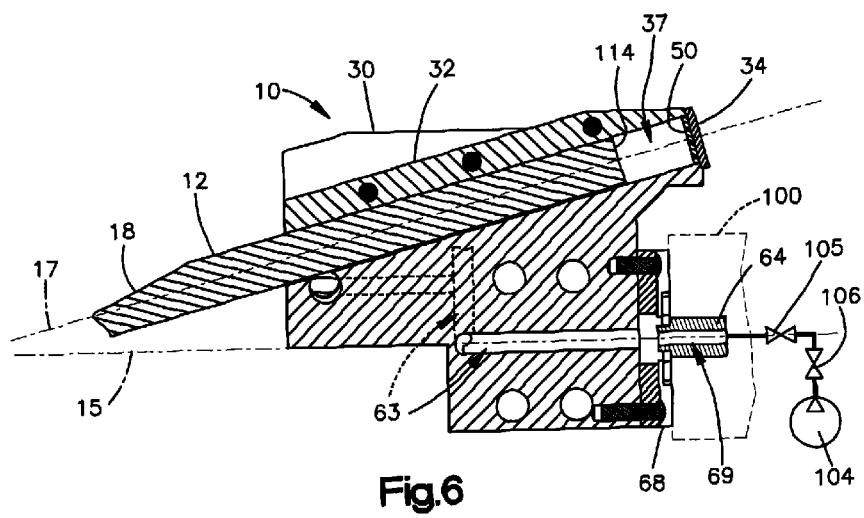

A pneumatic port 61 is centered on the first axis 15 at the rear of the main body 30. Passages 63 in the main body 30 communicate the port 61 with the chamber 37. A pull stud 64 (FIG. 6) extends through a central opening 65 in a mounting plate 68 at the rear of the main body 30. The pull stud 64 and mounting plate 68 are configured to couple and decouple the holder 10 with a chucking apparatus on an EDM machine in a known manner. An EDM fluid passage 69 extending through the pull stud 64 communicates with the port 61. This enables the pull stud 64 to serve as a pneumatic coupling for communicating the holder 10 with a source of pneumatic pressure when the holder 10 is decoupled from an EDM machine.

A pair of locking pins 70, one of which is shown in FIG. 5A, are arranged in the pneumatic passages 63 beside a pair of air inlet slots 71 at the chamber 37. Each locking pin 70 has an inclined, flat wedge surface 72 that projects transversely inward of the chamber 37 through the corresponding slot 71. When the passages 63 are pressurized pneumatically, the locking pins 70 are moved lengthwise against springs 74. This shifts the wedge surfaces 72 outward of the chamber 37 to provide clearance for insertion of the electrode 12 into the chamber 37. When the pressure is relieved, the springs 74 push the locking pins 70 back toward their original positions. This presses the wedge surfaces 72 against the electrode 12 to secure it in the chamber 37.

Other parts of the holder 10 include a spring 80 and a link 82. The spring 80 extends alongside the cover 32 in a direction parallel to the second axis 17. A front end 84 of the spring 80 is anchored to the cover 32. A rear end 86 of the spring 80 is connected to the link 82, which is movable lengthwise relative to the cover 32. The link 82 extends through a guide 88 on the cover 32, and is fastened to the back plate 34 at the rear of the cover 32. When the spring 80 is in the original, unstressed condition shown in the drawings, it holds the back plate 34 against the cover 32 to close the rear end of the chamber 37.

The electrode 12 is installed in the holder 10 in a series of steps, as shown in FIGS. 6-9. First, the holder 10 is mounted on a chucking apparatus 100 on a milling machine. The chucking apparatus 100 is adapted to communicate the pneumatic coupling/pull stud 64 with a source 104 of pneumatic pressure. As shown schematically, the pneumatic connection includes a standard pneumatic hose swivel 105 for rotation with the chucking apparatus 100, and a valve 106 between the swivel 105 and the source 104. When the valve 106 is open, pneumatic pressure is supplied from the source 104 to the chamber 37 through the valve 106, the swivel 105, the pneumatic coupling/stud 64, and the passages 63 in the main body 30 of the holder 10. The electrode 12 can then be inserted into the chamber 37 past the locking pins 70.

Figure 7:
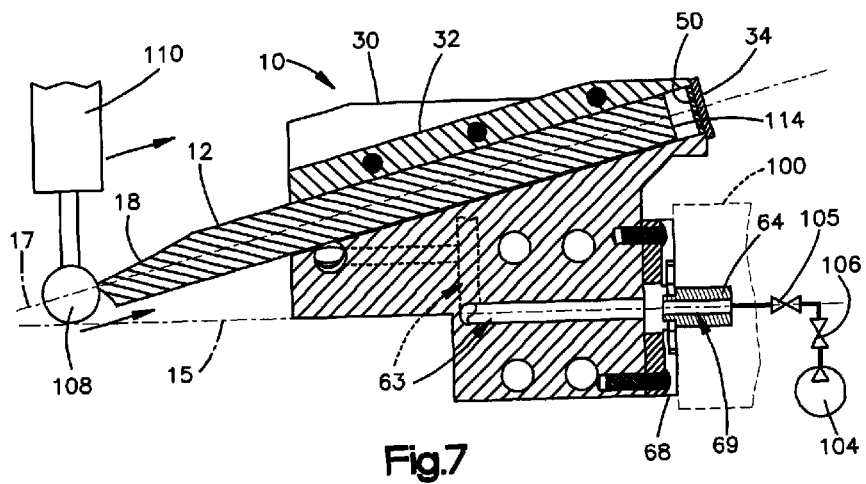

As shown in FIG. 7, a probe 108 on a multi axis spindle 110 is moved against the outer end 112 of the electrode 12 to move the electrode 12 more fully inward of the chamber 37. The probe 108 may push the inner end 114 of the electrode 12 against the elastomeric pad 50 on the back plate 34. The spring 80 can extend to allow the back plate 34 to move rearward from the cover 32 under the force applied by the electrode 12, and can then contract to return the back plate 34 to the cover 32. This protects the electrode 12 by damping the impact of the inner end 114 against the pad 50 and the back plate 34.

In the step shown in FIG. 8, the spindle 110 carries the probe 108 to a position that is spaced from the holder 10 a predetermined distance D along the axis 17. As the probe 108 is being moved away from the holder 10, a pneumatic thrust acts on the inner end 114 of the electrode 12 to push the electrode against the probe 108, and thus moves the electrode 12 along the axis 17 with the probe 108. When the probe 108 is stopped at its spaced position, it stops the advancing electrode 12 in a position projecting the predetermined distance D outward from the holder 10.

When the electrode 12 has been advanced to the position of FIG. 8, the pneumatic pressure in the chamber 37 is relieved, and the probe 108 is withdrawn as shown in FIG. 9. The holder 10 is then transferred from the chucking apparatus 100 on the milling machine to a chucking apparatus 118 (FIG. 10) on an EDM machine for multiple machining cycles on the EDM machine.

At the conclusion of a predetermined number of EDM cycles, or when inspection of the electrode 12 indicates wear for which redressing is needed, the holder 10 is removed from the EDM machine, but the worn electrode 12 is not removed from the holder 10. The holder 10 and worn electrode 12 are transferred together from the EDM machine back to the milling machine for redressing of the worn electrode 12 in the holder 10.

With the holder 10 again mounted on the chucking apparatus 100 on the milling machine, the probe 108 is again deployed to move the worn electrode 12 inward of the chamber 37. This is accomplished in the manner described above with reference to FIG. 7, but the reduced length of the worn electrode 12 may prevent the inner end 118 from impacting the pad 50 on the back plate 34. The probe 108 is next moved away from the holder 10 along the axis 17, and the chamber 37 is again pressurized to move the redressed electrode 12 back outward with the probe 108 until the probe 108 is stopped at the location where the worn electrode 12 projects outward the distance D, as described above with reference to FIG. 8.

In the next step, as shown in FIG. 11, a milling cutter 120 on the spindle 110 is deployed to restore the outer end portion 18 of the worn electrode 12 to its original configuration. The chucking apparatus 100 on the milling machine can rotate the holder 10 about the first axis 15 as needed for the cutter 120 to access the electrode 12 from all sides in the cutting step. When reshaping of the outer end portion 18 is complete, the holder 10 with the redressed electrode 12 is ready to be transferred back to the EDM machine for another series of machining cycles with the redressed electrode 12.

In the initial step described above with reference to FIG. 6, the electrode 12 is preferably inserted into the chamber 37 manually, and the holder 10 is preferably mounted on the milling machine automatically. The steps of transferring the holder 10 between the milling machine and the EDM machine, with the electrode 12 remaining in place in the holder 10, also are preferably performed automatically.

For example, a system 140 for transferring the holder 10 is shown schematically in the top view of FIG. 12. This system 140 includes a robot 142 mounted on a horizontal track 143. The robot 142 has an arm 144 with a fork 148. The arm 144 is pivotal about a vertical axis 149, and is telescopic radially relative to the axis 149 to move the fork 148 into and out of operative association with work stations that are spaced apart along the track 143. The number of components and work stations in such a system may vary, but the illustrated embodiment includes a milling machine 150, multiple CNC machine tools 154, and a carousel 158.

The milling machine 150 includes the chucking apparatus 100 described above. The milling machine 150 also includes the multi-axis spindle 110 for the probe 108 and the cutter 120. Each CNC machine tool 154 in this particular embodiment is an EDM machine with a chucking apparatus 118 as described above. The carousel 158 has a supply of holders 10, each of which is EDM-ready with a pneumatic coupling/stud 64 and a new or redressed EDM electrode 12 projecting the predetermined distance D outward from the holder 10. The new electrodes 12 could be placed in their holders 10 on the milling machine 150 as described above, or on a similar machine that is not necessarily adapted for milling. The fork 148 on the robot arm 144 is configured to move into and out of engagement with a pneumatic coupling/stud 64 to lift, carry, and release a holder 10 in a known manner.

A controller 160, as shown schematically in FIG. 13, is operatively associated with the robot 142, the milling machine 150, the EDM machines 154 and the carousel 158. The controller 160 may comprise any suitable programmable logic controller or other control device, or combination of such control devices among the various machines, and has hardware and/or software configured to operate the robot 142, the milling machine 150, the EDM machines 154 and the carousel 158 as described and claimed. The controller 160 is also configured to operate the valve 106 between the milling machine 150 and the source 104 of pneumatic pressure as described and claimed.

In an example of operation of the system 140, the robot 142 loads each EDM machine 154 with an EDM-ready holder 10 from the supply on the carousel 158. When any one of the electrodes 12 at the EDM machines 154 requires redressing after multiple machining cycles, the robot 142 transfers the holder 10 with the worn electrode 12 back to the carousel 158, and replaces it with another EDM-ready holder 10 taken from the supply on carousel 158.

While the machining operations are being performed at the EDM machines 154, the robot 142 can replenish the supply of EDM-ready holders 10 at the carousel 158 without interrupting the EDM operation. This is accomplished by transferring holders 10 with worn electrodes 12 back and forth from the carousel 158 to the milling machine 150 for redressing while EDM machining operations continue at the EDM machines 154 with other holders 10 having either new or redressed electrodes 12.

This written description sets for the best mode of the invention, and describes the invention so as to enable a person of ordinary skill in the art to make and use the invention, by presenting examples of the elements recited in the claims. The patentable scope of the invention is defined by the claims, and may include other examples that occur to those of ordinary skill in the art. Such other examples are intended to be within the scope of the claims if they do not differ from the literal language of the claims, or if they have insubstantial differences from the literal language of the claims.

The invention claimed is:

1. An apparatus for use with an electrode and a CNC machine tool, the apparatus comprising:
   a holder configured to hold the electrode in a position projecting outward from the holder;
   a pull stud configured to mount the holder on the CNC machine tool;
   a driving mechanism operative to provide a motive force; and
   a coupling configured to couple the holder with the driving mechanism when the holder is not mounted on the CNC machine tool;
   wherein the holder is configured to transmit the motive force from the coupling to the electrode in the holder to move the electrode outward of the holder.

2. An apparatus as defined in claim 1 wherein the holder has inner surfaces defining a pneumatic pressure chamber configured to receive the electrode in a position in which pneumatic pressure in the chamber can act directly on the electrode to move the electrode outward of the holder.

3. An apparatus as defined in claim 1 further comprising a stop structure located in a path of movement of the electrode at a predetermined distance from the holder to limit movement of the electrode to a position projecting the predetermined distance outward from the holder.

4. An apparatus as defined in claim 3 wherein the stop structure comprises a multi axis spindle and a probe mounted in the spindle.

5. An apparatus as defined in claim 1 further comprising a milling machine with a chucking apparatus configured for the pull stud to mount the holder on the milling machine.

6. An apparatus as defined in claim 5 further comprising a multi axis spindle, a probe receivable in the spindle, and a controller configured to move the spindle relative to the milling machine so as to place the probe in a path of movement of the electrode at a predetermined distance from the holder when the holder is mounted on the milling machine, and thereby to limit movement of the electrode to a position projecting the predetermined distance outward from the holder on the milling machine.

7. An apparatus as defined in claim 6 further comprising a cutter receivable in the spindle, and wherein the controller is configured to move the spindle relative to the milling machine to redress an electrode projecting outward from the holder on the milling machine.

8. An apparatus for use with an electrode and a CNC machine tool, the apparatus comprising:
   a holder configured to hold the electrode in a position projecting outward from the holder;
   a pull stud configured to mount the holder on the CNC machine tool;
   a pneumatic coupling configured to communicate the holder with a source of pneumatic pressure when the holder is not mounted on the CNC machine tool; and
   means for transmitting the force of pneumatic pressure from the pneumatic coupling to the electrode in the holder, and thereby to move the electrode outward of the holder,
   wherein the force transmitting means includes pneumatic passages in the holder.

9. An apparatus as defined in claim 8 wherein the pull stud includes the pneumatic coupling.

10. An apparatus for use with an electrode and a CNC machine tool, the apparatus comprising:
    a holder configured to hold the electrode in a position projecting outward from the holder;
    a pull stud configured to mount the holder on the CNC machine tool;
    a pneumatic coupling configured to communicate the holder with a source of pneumatic pressure when the holder is not mounted on the CNC machine tool;
    means for transmitting the force of pneumatic pressure from the pneumatic coupling to the electrode in the holder, and thereby to move the electrode outward of the holder; and a stop structure located in a path of movement of the electrode at a predetermined distance from the holder to limit movement of the electrode to a position projecting the predetermined distance outward from the holder.

11. An apparatus as defined in claim 10 wherein the stop structure comprises a multi axis spindle and a probe mounted in the spindle.

12. An apparatus for use with an electrode and a CNC machine tool, the apparatus comprising:
- a holder configured to hold the electrode in a position projecting outward from the holder;
- a pull stud configured to mount the holder on the CNC machine tool;
- a pneumatic coupling configured to communicate the holder with a source of pneumatic pressure when the holder is not mounted on the CNC machine tool; and
- means for transmitting the force of pneumatic pressure from the pneumatic coupling to the electrode in the holder, and thereby to move the electrode outward of the holder,
- wherein the transmitting means defines a pneumatic pressure chamber that is configured within the holder to receive the electrode in a position in which pneumatic pressure in the chamber can act directly on the electrode to move the electrode outward of the holder.

13. An apparatus as defined in claim 12 further comprising a milling machine with a chucking apparatus configured for the pull stud to mount the holder on the milling machine.

14. An apparatus as defined in claim 13 further comprising a multi axis spindle, a probe receivable in the spindle, and a controller configured to move the spindle relative to the milling machine so as to place the probe in a path of movement of the electrode at a predetermined distance from the holder when the holder is mounted on the milling machine, and thereby to limit movement of the electrode to a position projecting the predetermined distance outward from the holder on the milling machine.

15. An apparatus as defined in claim 14 further comprising a cutter receivable in the spindle, and wherein the controller is configured to move the spindle relative to the milling machine to redress an electrode projecting outward from the holder on the milling machine.

* * * * *